United States Patent [15] 3,671,929
Ruehle et al. [45] June 20, 1972

[54] CONVERSION OF SEISMIC DEPTH SECTIONS TO SEISMIC TIME SECTIONS

[72] Inventors: William H. Ruehle, Duncanville; John D. Hodge, Jr., Dallas; William C. Gray, Houston, all of Tex.

[73] Assignee: Mobil Oil Corporation

[22] Filed: Jan. 20, 1970

[21] Appl. No.: 4,382

[52] U.S. Cl. ............ 340/15.5 FC, 340/15.5 R, 340/15.5 DP, 340/15.5 DS
[51] Int. Cl. ........................................................ G01v 1/00
[58] Field of Search ............... 340/15.5 SS, 15.5 DP, 15.5 FC

[56] References Cited

UNITED STATES PATENTS

| 3,311,874 | 3/1967 | Sheffield | 340/15.5 F |
| 3,152,314 | 10/1964 | Mut | 340/15.5 SS |
| 3,241,102 | 3/1966 | Peterson | 340/15.5 SS |

OTHER PUBLICATIONS

Digigraphic Man Machine Systems, Preliminary Operator's Guide, Control Data Corp, Dec. 1965.

*Primary Examiner*—Samuel Feinberg
*Assistant Examiner*—H. A. Birmiel
*Attorney*—William J. Scherback, Frederick E. Dumoulin, Arthur F. Zobal, Andrew L. Gaboriault and Sidney A. Johnson

[57] ABSTRACT

In seismic exploration, a seismic time section is generated in a form which can be compared to the original seismic traces. In the preliminary processing, a seismic depth section is generated to specify the velocity, thickness and depth of each reflecting zone of the subsurface formation. For a particular reflecting zone, the coordinates of sampling points along the interface are generated. The ray path, normal to a sampling point and extending through successive layers to a surface coordinate point, is determined. From the velocity and thickness of each zone, the travel time of seismic energy between the sampling point and the surface coordinates is computed. Travel times are plotted as a function of the surface coordinates to generate a travel time curve. The foregoing procedure is repeated for succeeding reflecting zones to generate a time section which can be compared to the original seismic traces.

8 Claims, 9 Drawing Figures

CONVERSION OF SEISMIC DEPTH SECTIONS TO SEISMIC TIME SECTIONS

BACKGROUND OF THE INVENTION

This invention relates to seismic exploration and more particularly to generating a seismic time section which can be compared to the original field data.

Seismic modeling provides the geophysicist with knowledge of the manner in which seismic waves are reflected from various configurations of subsurface formations. Time sections generated in modeling studies produce a miniaturized exploration program carried out on metal and plastic plates. U.S. Pat. Nos. 2,834,422—Angona, and 3,246,290—McClure, are directed to analog type modeling studies. These investigations greatly increase the understanding of wave propagation phenomena associated with exploration seismology. However, analog model studies pose a number of problems which are not easily solved. Modeling parameters are limited. That is, plate materials have a limited range of velocity and density. The time required to construct any but the simplest models is prohibitive. Also, analog models produce many wave phenomena which are of no consequence in exploration seismology, such as converted waves, shear waves and reflections from model edges.

The use of a digital computer to generate seismic models provides an attractive alternative to analog models. Copending application Ser. No. 842,523, filed July 17, 1969, Guinzy et al., is directed to the use of a digital computer to determine interval velocity by an iteration process which fits an arbitrarily dipping Snell's Law layered model to the field data.

SUMMARY OF THE INVENTION

In accordance with an important aspect of the present invention, the principles of seismic modeling with a digital computer are extended to produce a seismic time section depicting travel time versus distance curves which can be compared to the original field data.

In accordance with another important aspect of the present invention, the arrival times of seismic energy reflected from a fault are generated by the same process used to generated the arrival time curve for reflecting interfaces.

In accordance with another aspect of the present invention, the coordinates of a point on a seismic depth section are automatically translated by means of a ray tracing algorithm into the coordinates of the corresponding point on a seismic time section.

In accordance with the specific embodiment of the invention, the velocity, thickness and depth of each reflecting zone of subsurface formations are automatically determined from seismic field data representing the arrival time and time dip of the seismic reflections. For a particular reflecting zone, the coordinates of sampling points along the interface are generated. The ray path at each sampling point, normal to the interface, is generated to determine the surface coordinates where the ray strikes the surface. From this ray path, and the velocity and thickness of each zone, the time for seismic energy to travel between the sampling point and the surface coordinate point is determined. The times are generated for all sampling points on the interface and these times are plotted in the form of a travel time versus distance curve. Repeating the process for succeeding reflecting zones generates a time section which can be compared to the original seismic data.

The invention can be performed in a batch type process with all steps automatically performed to generate a seismic time section which is produced by an automatic plotter. Alternatively, computer graphics type equipment can be used in which there is a display generated at succeeding stages of the process. The coordinates of a point on a seismic depth section are generated by the application of an interactive device such as a light pen to the point. These coordinates are converted by ray tracing to the coordinates of the corresponding point on the seismic depth section. The seismic depth section is displayed on another display device.

By using computer graphics techniques, the interpreter can enter the configuration of a suspected fault on the seismic depth section. The travel times for seismic energy reflected from this fault are automatically generated by the same procedure used to generate travel times from reflecting interfaces.

DESCRIPTION OF THE PREFERRED EMBODIMENT

Figure 1:
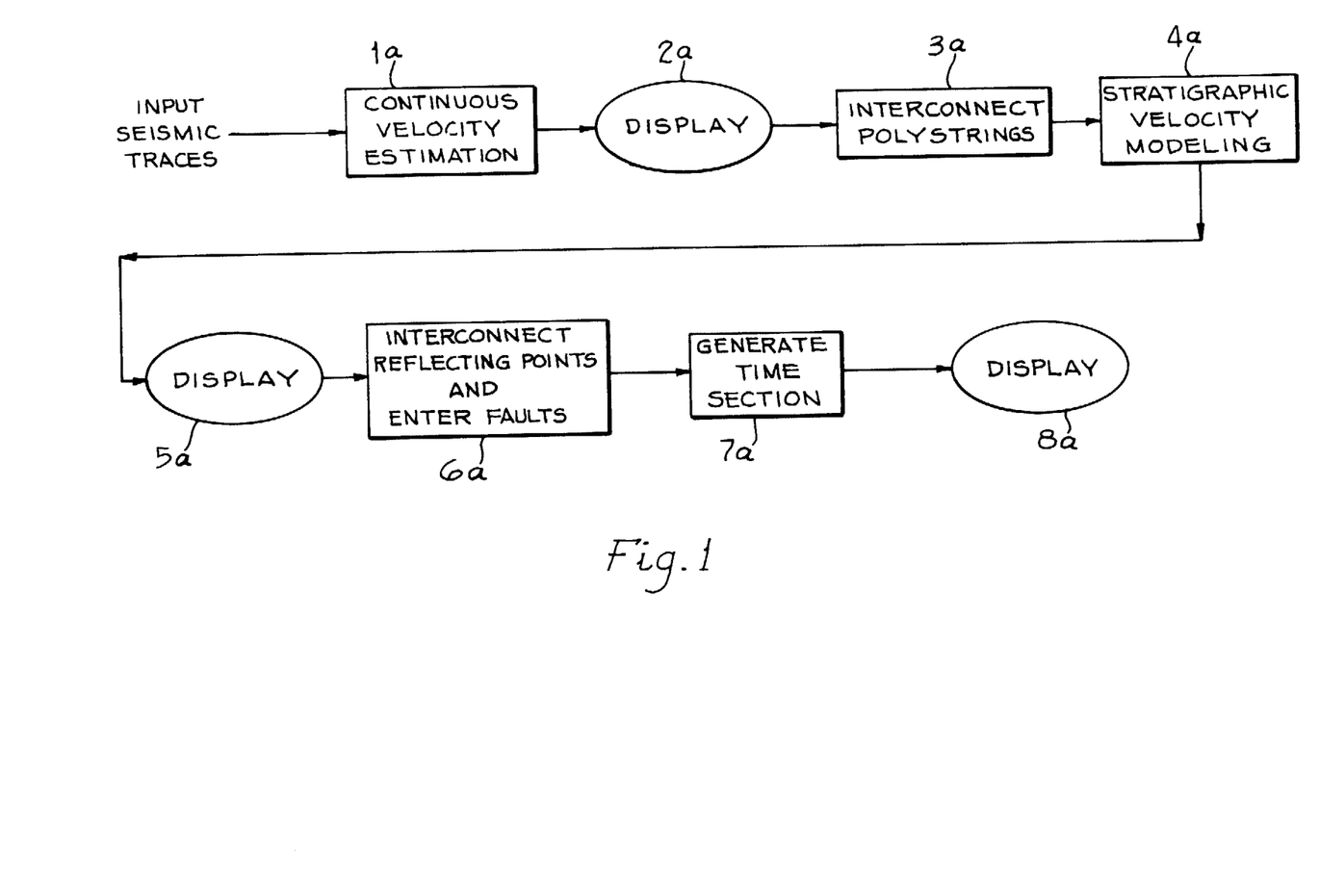
FIG. 1 is a block diagram of the invention.

Referring to FIG. 1, the initial step in the process of this invention is the estimation of the acoustic velocity characteristics of the earth in the various reflecting zones of the subsurface formation. There are many suitable procedures for determining the acoustic velocity characteristics of the earth from seismic records. As indicated at 1a, one particularly suitable procedure is that described in the copending application of William H. Ruehle, Ser. No. 868,784 filed Oct. 23, 1969.

Briefly, this process provides a continuous estimation of the velocity characteristics of the earth by determining the signal power in seismic traces along an index set of travel time versus horizontal distance curves. An acoustic velocity characteristic is associated with each travel time curve. The maximum signal power indicates the travel time curve and the associated acoustic velocity. In this manner, acoustic velocity is estimated for each reflection.

The output of the velocity estimation process is a plot of reflections occurring at various record times together with the acoustic velocity associated with each reflection. Such a plot can be displayed on the display device of a computer graphics system. One suitable computer graphics system capable of displaying this type of plot is the CDC Digigraphics system No. 270. The display step is indicated at 2a in FIG. 1.

Such a display includes plots of numerous, unconnected, reflections in the reflecting interfaces in the subsurface which have been detected during the signal detection process. In order to generate a time section suitable for further processing, it is necessary to interconnect these various unconnected reflection strings. Normally, it will be apparent to a geophysicist observing such a display as to which strings should be interconnected. By using an interactive device such as a light pen on the face of the display device, these strings can be automatically interconnected. Other interactive devices such as a light pencil or stylus can be used. Programs for interconnecting the reflections in this manner are available with most computer graphics systems. The process may be referred to as interconnecting "polystrings". This step is indicated at 3a in FIG. 1. One example of a suitable program is referred to on page 27 of the PRELIMINARY OPERATOR'S GUIDE, for the aforementioned CDC Digigraphic Systems.

After the polystrings have been interconnected, the display indicated at 3a will be of the form shown in FIG. 5 of the aforementioned Ruehle application. The signals represented by this display are inputted to a modeling process indicated at 4a. The signals, representing continuous reflections on a time versus horizontal distance plot, are converted to a depth section by the modeling routine 4a. More specifically, one suitable routine is the stratigraphic velocity modeling routine disclosed in application Ser. No. 842,523, filed July 17, 1969, Guinzy et al. Briefly, the velocity modeling process determines interval velocity by iteration which fits an arbitrarily dipping Snell's Law layered model to the field data. Reflections on the seismogram and characterized by three parameters, their zero offset arrival time $T_0$, their apparent average velocity $V_1$, and their time dip $\Delta T$. That is, a set of reflections 1, 2, 3 . . . $i$ can be characterized by the set of arrival times $T_i(X)$ and dips $\Delta T_i$. These parameters can be determined directly from the field seismograms by several processes but the aforementioned continuous velocity estimation technique is particularly suitable for this purpose.

The stratigraphic velocity modeling routine 4a generates the interval velocity by fitting a dipping layered model to this data. In addition, the migrated subsurface attitude of the reflector is obtained. The use of the velocity model permits the migration of the original data into its true spatial position. The output of the stratigraphic velocity modeling routine represents the spatial position of each reflecting point together with the interval velocity of the layers between the reflecting points.

This output is displayed as indicated at 5a. At each estimate of interval velocity, and each indicated reflector, a model of the reflecting zone is generated by merely interconnecting the indicated reflecting points. Again, this step is easily performed with a computer graphics type of system. At the same time, suspected faults in the subsurface layering can be entered with an interactive device. This step is indicated at 6a in FIG. 1.

The resultant output indicates the interval velocity, thickness, depth and dip of each reflecting zone of a subsurface formation. From this output, a seismic time section is automatically generated, in the computer, and in a form which can be compared to the original seismic traces. The generation of the time section, in accordance with the principles of this invention, is indicated at 7a. The resultant output is utilized by plotting means for the production of the seismic time section as indicated at 8a. The plotting means may be cathode ray tube type of display device on which the seismic time section is displayed. Alternatively, the plotting means may be an automatic plotter, one example of which is the Calcomp plotter available from California Computer Products Company.

Before describing in detail the operation of the digital computer in generating the seismic time section, there will be described the general principles involved in generating this time section.

Figure 2:
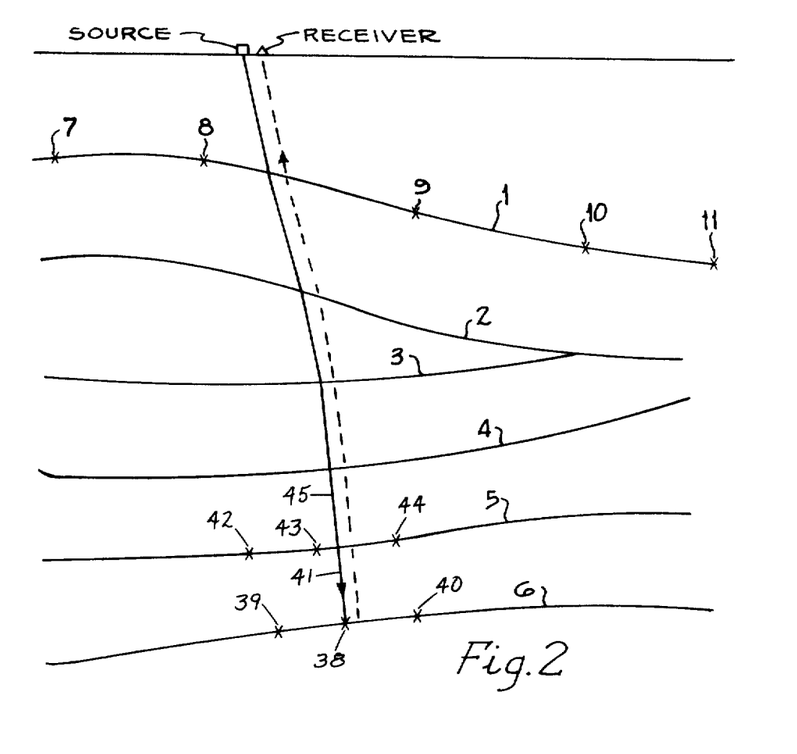
FIG. 2 shows ray paths in a multilayered model in which the source and the receiver are at the same location.

In one embodiment, the invention takes advantage of the fact that a perfectly corrected time section is one in which each trace after correction has the same form as one in which the source and receiver occupy the same position. In such a system, the downgoing and upgoing ray paths to a reflector overlap, and the reflection angle is 90°. FIG. 2 shows such a ray path between a source and receiver at the same location.

The model seismic depth section which is the input to the process is in the form of data representing the continuous interfaces 1–6 in FIG. 2. These interfaces define the depth and dip of reflecting zones and the interval velocity of each reflecting zone is specified. For a particular reflecting zone, the coordinates of sampling points along the interface are generated. In FIG. 2, the $x,y$ coordinates of the sampling points 7–11 on the interface 1 are generated by the system shown in FIG. 1. As will be subsequently explained, the sampling points must be much more dense than is indicated in FIG. 2.

For each of these sampling points, the ray path normal to the interface and extending to a surface coordinate point is generated.

Figure 3:
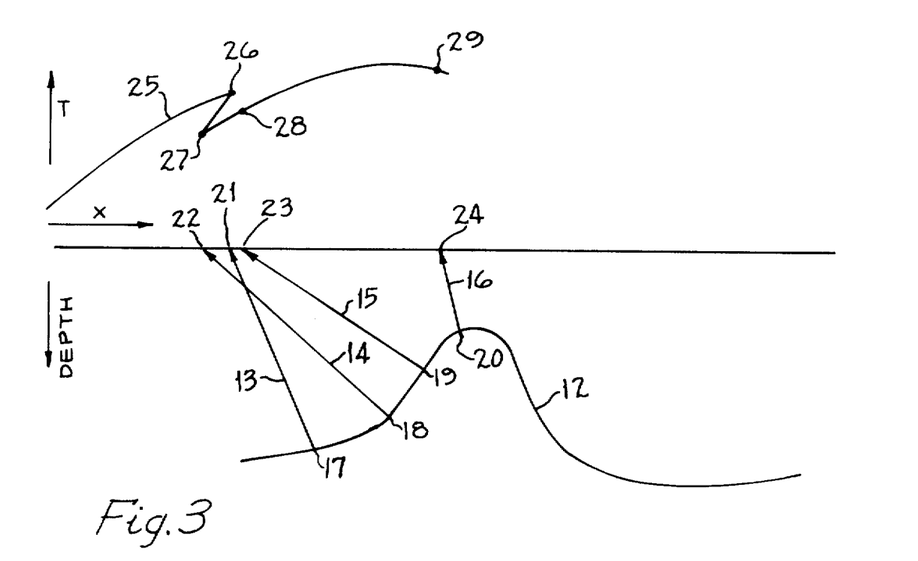
FIG. 3 shows the ray paths generated for a single interface and the travel time curve computed from these ray paths.

This can be better seen with reference to FIG. 3. FIG. 3 shows, at the bottom, a single reflecting interface 12 with ray paths 13–16 extending from the 17 - points 17 20 to the surface coordinate points 21–24. The ray path 13 is normal to the interface 12 at the sampling point 17 and extends through the first earth layer to the surface coordinate point 21.

From the thickness of the reflecting layer and from the interval velocity of this layer, the travel time along this ray path is computed. The computed travel time forms one point on the travel time curve 25. In this case, the computed travel time forms the point 26 at the horizontal distance corresponding with the horizontal distance of the surface coordinate point 21. Similarly, the travel times along the ray paths 14, 15 and 16 are computed and plotted as the points 27, 28 and 29 on the travel time curve 25.

FIG. 3 demonstrates the requirement for greater density of sampling points than is depicted. Because of the presence of the anomaly in the reflecting interface, the surface coordinate points 23 and 24 are widely separated and a linear interpolation (time curve 25) between these points is not a proper representation of the true time curve. Therefore, additional sample points are added to the interface 12 to determine the proper shape of the travel time curve 25. For the case shown in FIG. 3, it has been found that the use of approximately 500 sampling points for each interface produces satisfactory results.

The generation of the ray path and the computation of travel times through successive layers can be explained in more detail with reference to FIG. 2. Assume that the generation of the ray path begins at the sampling point 38 on the interface 6. The equation defining the line between the sampling points 39 and 40 is:

$$y = mx + b$$

In the foregoing, $m$ is the slope of the straight line and it is equal to tangent $\alpha$ where $\alpha$ is the dip of the interface 6. This is one of the inputs to the system. The line which is perpendicular to the interface at the point 38 has a slope equal to $-1/m$. The coordinates $x_2, y_2$ at the sampling point 38 are known. Therefore, the equation of the line 41, extending perpendicularly to the interface at the point 38, is determined. The intersection of this line with the interface 5 is determined as follows. A search is conducted for the intersection of the line 41 with the line falling between two sampling points. For example, the equation of the line joining points 42 and 43 is known. A determination can be made as to whether there is an intersection of the line 41 with this line. Then, a determination is made as to whether there is an intersection of the line between the points 43 and 44 with the line 41. The coordinates of this intersection are determined and are denoted $x_2', y_2'$. The length of the ray path 41 between the interfaces 5 and 6 is:

$$\sqrt{(x_2 - x_2')^2 - (y_2 - y_2')^2}$$

The travel time over this distance is the distance divided by the velocity in that layer. Interval velocity is an input to the system.

Note that the angle of incidence of the ray path segment 41 with the interface 5 can be determined. As previously noted, the equation for the segment 41 is known and the equation of the line between the points 43 and 44 is known. Therefore, the angle of intersection between these two lines can be determined. From this, the angle of refraction of the ray path segment 45 can be determined from Snell's Law:

$$\sin \alpha_R / \sin \alpha_I = V_2/V_1$$

where $\alpha_R$ is the angle of refraction, $\alpha_I$ is the angle of incidence, $V_2$ is the interval velocity of the layer through which the ray path segment 45 extends, and $V_1$ is the velocity of the layer through which the ray path segment 41 extends. The equation of the line segment 45 is determined from this angle and, the intersection of this line segment with the interface 4 is determined as previously explained. The same calculation of travel time is performed. The process is repeated for succeeding layers until the travel time over each of the layers has been calculated. This is plotted as previously described.

Figure 4:
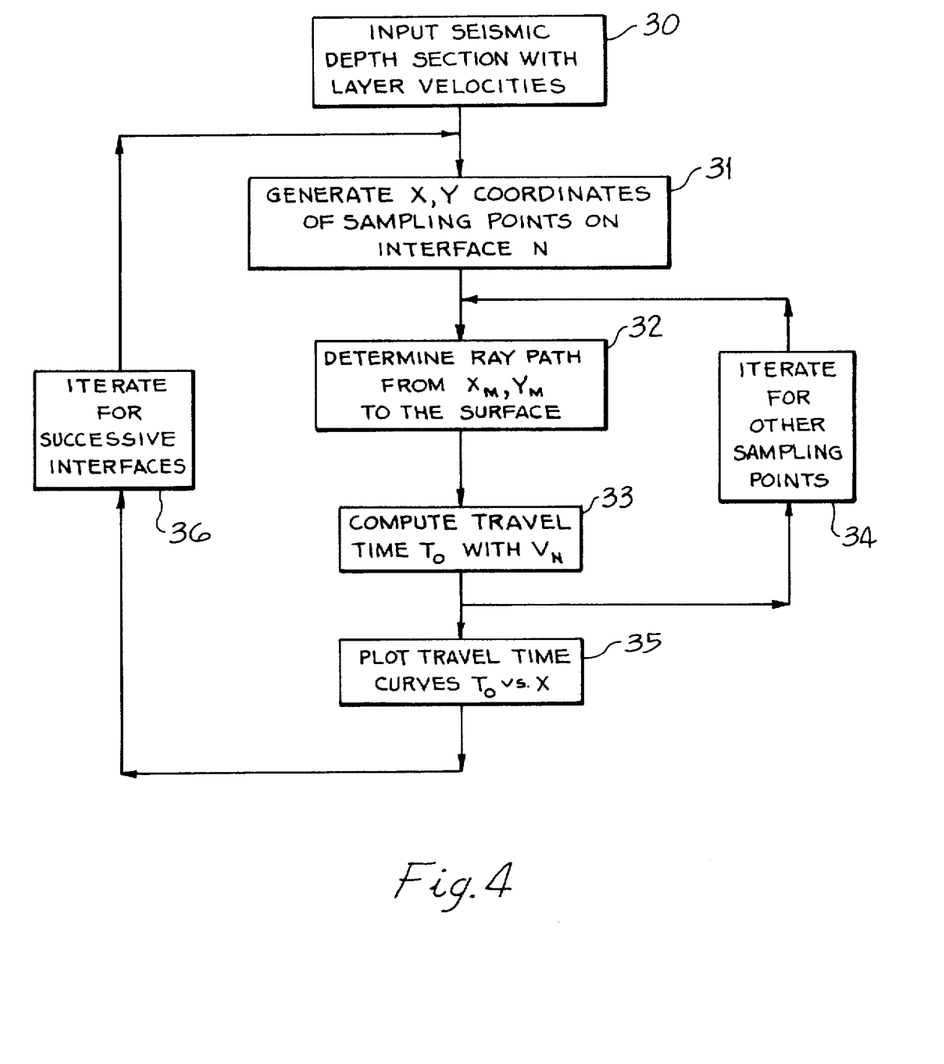
FIG. 4 is a flow sheet depicting the manner in which the seismic time section is generated in a digital computer.

The foregoing can be summarized with respect to the operation of the digital computer in performance of the invention by referring to FIG. 4. FIG. 4 is a flow sheet depicting the digital computer performance of the invention.

As indicated at 30, the input to the process is a seismic depth section specifying the interval velocity, thickness, depth and dip of each reflecting zone of a subsurface formation. The first step, 31, is the generation of the $x,y$ coordinates of each of the sampling points. For example, the $x,y$ coordinates of the sampling points 17-20 on the interface 12 in FIG. 3 are generated.

The next step, 32, is the determination of the ray path from the coordinates, designated generally $X_N$, $Y_N$ to the surface. From the depth and dip of the subsurface reflector, the length of the ray path 13, for example, is determined. From the velocity $V_N$ for that layer, the travel time $T_0$ to the surface coordinate point is computed as indicated at 33. As indicated as 34, the computation of the travel times is iterated for each of the other sampling points on the first interface.

At 35, the travel times are plotted as a function of horizontal distance X to produce a travel time curve for the first interface. Then, the procedure is iterated for successive interfaces as indicated at 36. In making the computation of travel times for successive layers, the ray path at each interface between the surface and the reflector of interest is specified by Snell's Law. In making the determination of travel time, the interval velocity of each layer through which the ray path travels is used over that particular layer.

Figure 5:
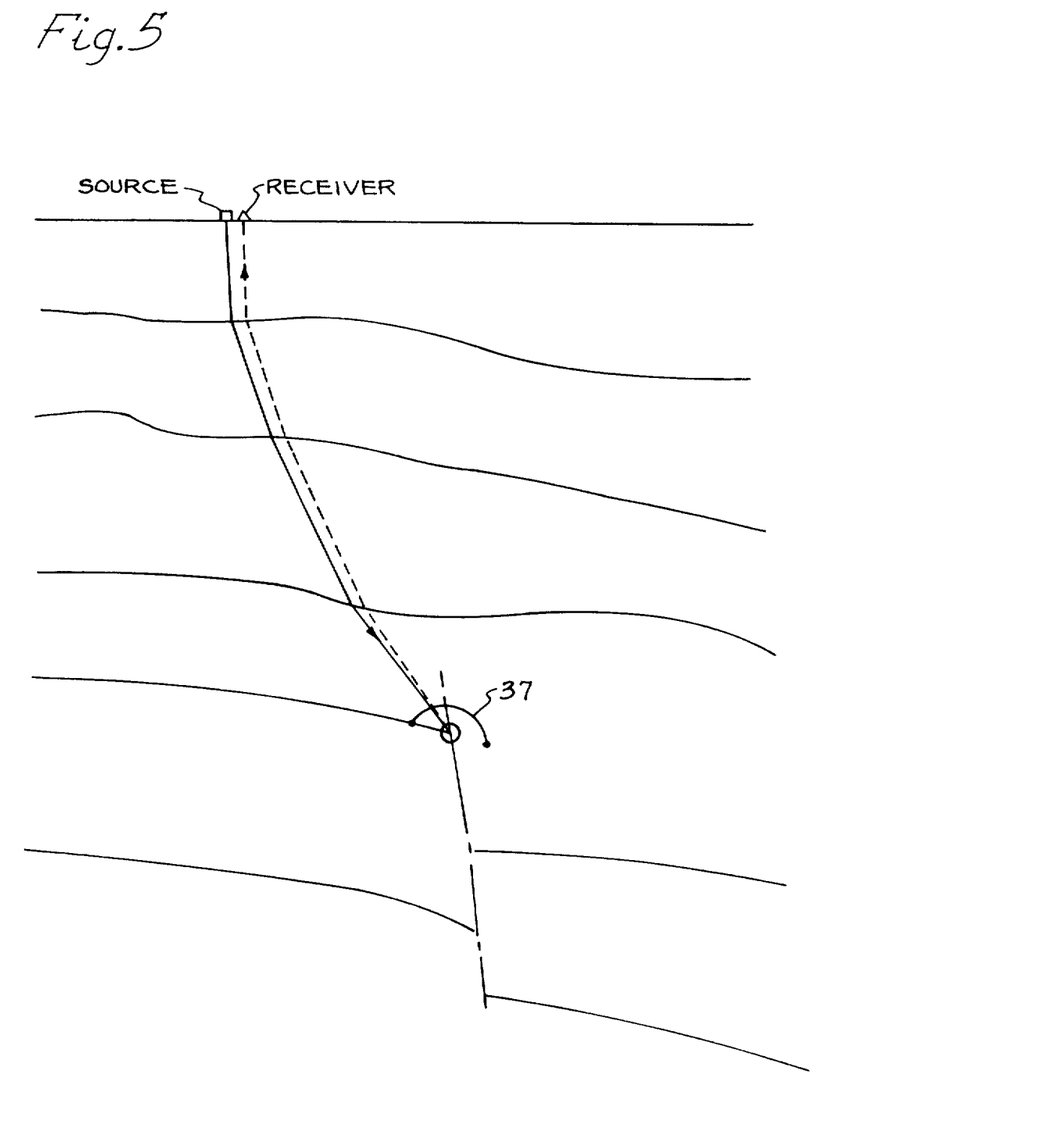
FIG. 5 shows the ray paths of the diffractions from a faulted interface.

The process of this invention also has provision for diffractions at faults. Studies of arrival time curves of diffractions show that the point source located at the break in the interface caused by faulting accounts for the shape of the travel time curve. FIG. 5 shows a ray emanating from a point source located at a faulted interface.

In accordance with an important aspect of the present invention, the periphery 37 around the point source is sampled with the same number of sampling points as are employed on an interface. For example, 500 sampling points are used along the periphery 37 and the ray paths from each of these sampling points are traced. Because of this, the same process previously described with respect to an interface is used for determining a set of ray paths emanating from a fault.

Figure 6:
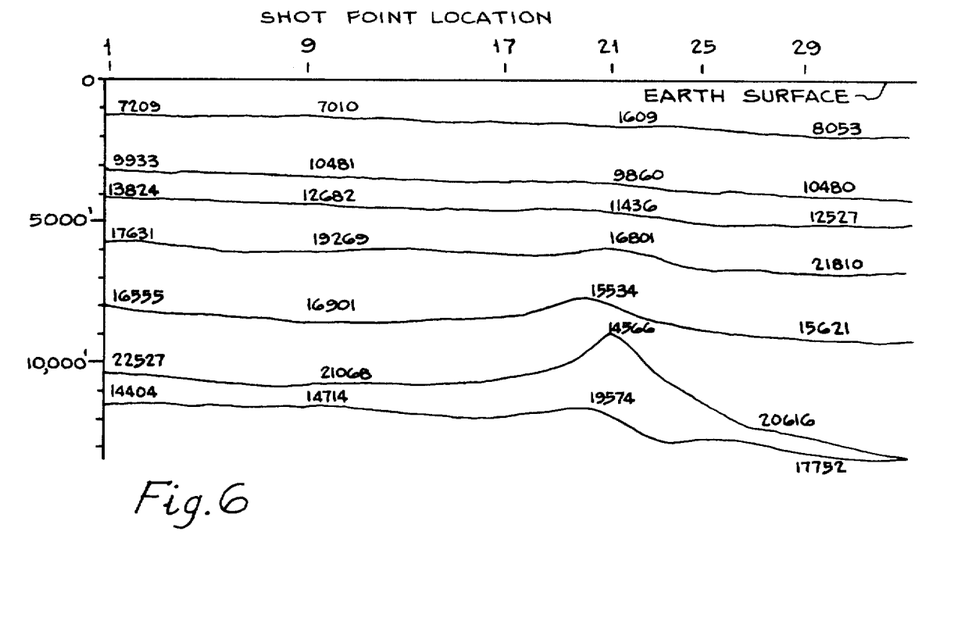
FIG. 6 shows a seismic depth section as generated during a batch type process.
Figure 7:
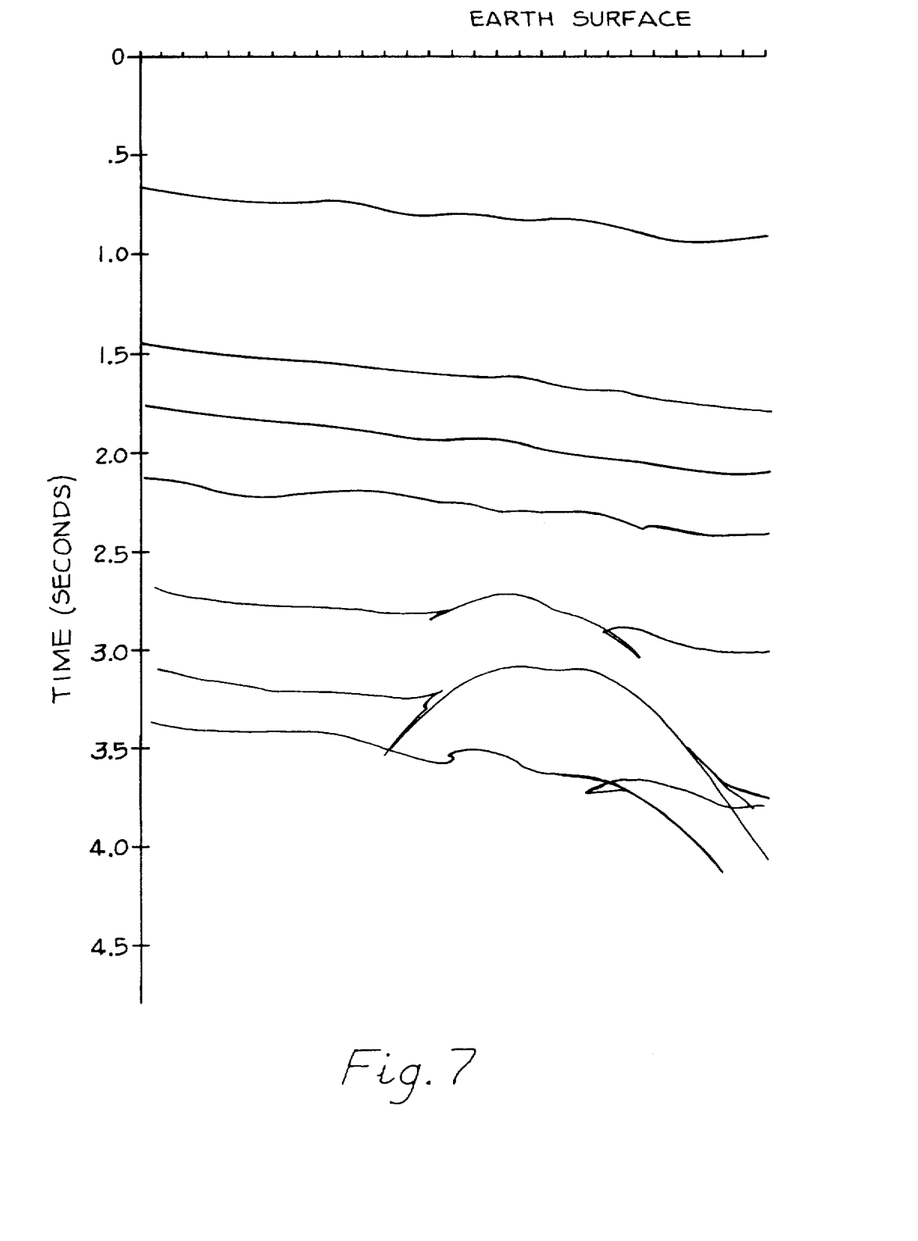
FIG. 7 shows a seismic time section as generated during a batch type process.

As previously mentioned, the invention may be performed in a batch type process in which all parameters are coded on cards and the output is in the form of a plot. In this type of processing, FIG. 6 is representative of the input. That is, FIG. 6 is a plot of the data which is the output of step 6 in FIG. 1. In FIG. 6, the interval velocities indicated by the numbers along the interface lines as determined by the aforementioned stratigraphic velocity estimation technique in the previously mentioned Ruehle et al application, appear as printouts at the appropriate places on the interfaces. FIG. 7 is a plot of the output of the process of the present invention. That is, it is a seismic time section which can be compared to the field data.

Figure 8:
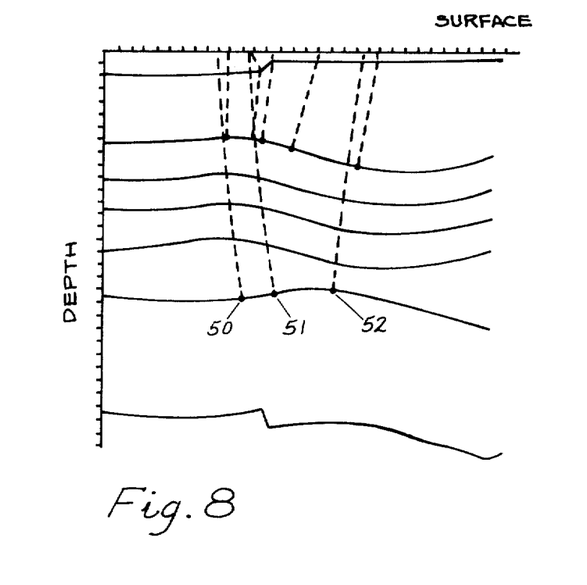
FIG. 8 shows a seismic depth section generated during a computer graphics type process.
Figure 9:
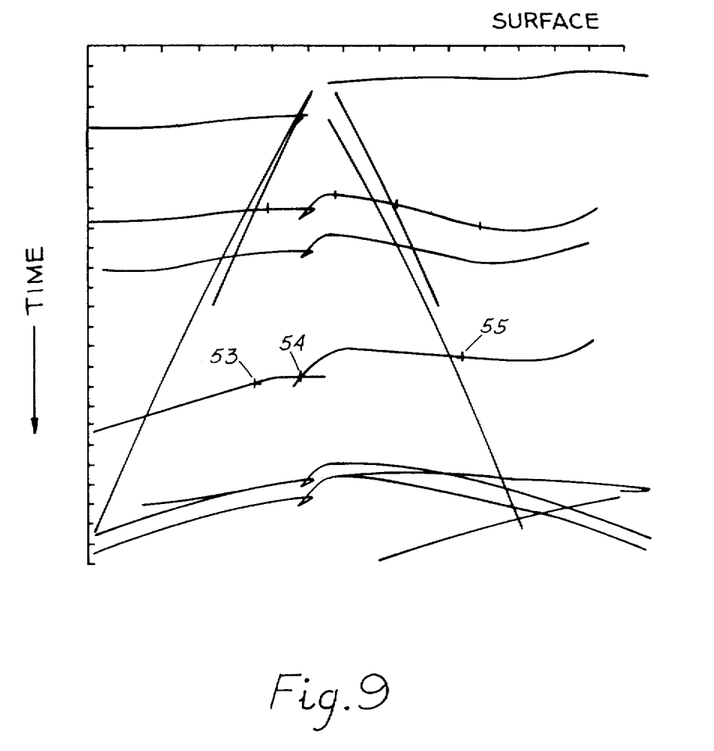
FIG. 9 shows a seismic time section generated during a computer graphics type process.

In another form of the process of this invention, a computer graphics process is employed. In this process, the parameters are entered with an interactive device through a cathode ray tube display. In this process, the parameters can be altered as is required or desired. The output of the computer graphics type of process is in the form of a display on a display device. FIG. 8 is an example of a display of the input and FIG. 9 is a display of the output, that is, a display of the seismic time section.

The process in the computer graphics form has another important aspect. This is that ray paths from any desired point on any interface to the surface can be traced and corresponding points on the travel time curves of the time section can be determined. For example, assume that the geophysicist wishes to study reflections from particular points on an interface, for example, from the points 50 – 52 on the sixth interface in FIG. 8. The coordinates of these points are entered into the computer by the interactive device. By the process of this invention, the ray paths, shown by dashed lines in FIG. 8, are automatically determined and the ray paths are used to compute travel times. The travel times along the ray paths appear as times on the time curves displayed in FIG. 9. The times 53-55 in FIG. 9 correspond to the points 50-52 on FIG. 8.

The method of the present invention is particularly well suited to be practiced on a general purpose digital computer. Many different programs can be derived to carry out this method.

One particular computing system which is suitable for use is supplied by the Control Data Corporation under the general model designation 6600, and includes the following components:

6604 Central Computer, 65K Memory
6608 Disc System
6602 Console Display
6681 Data Channel Converter
3228 Magnetic Tape Controller
607 Magnetic Tape Transport
3447 Card Reader Controller
405 Card Reader
3256 Line Printer Controller
501 Line Printer While a particular embodiment of the invention and certain modifications have been described, other modifications may be made. The following claims are, therefore, intended to cover any such modifications within the true spirit and scope of the invention.

What is claimed is:

1. In seismic exploration wherein seismic traces represent the arrival time of seismic reflections, the method of utilizing an automatic computing system and plotting means comprising:
   converting said seismic traces to a seismic depth section representing the interval velocity, depth, and dip of the reflecting zones of a subsurface formation, and
   converting said seismic depth section to a seismic time section representing the travel times to the reflecting zones as functions of the subsurface coordinates along the line of exploration.

2. In seismic exploration wherein the interval velocity, depth and dip of each reflecting zone of a subsurface formation are automatically determined from seismic traces representing the arrival time of seismic reflections, the method of utilizing an automatic computing system and plotting means to generate a seismic time section in a form which can be compared to the original seismic traces comprising:
   a. for a particular reflecting zone, generating, in said computing system, the coordinates of sampling points along the interface of said reflecting zone,
   b. generating, in said computing system, the ray path at each of said sampling points extending through successive layers to a surface coordinate point representing the surface of the earth,
   c. computing, in said computing system, from the velocity and thickness of each zone, the travel time for seismic energy to travel between the sampling point and the surface coordinate,
   d. plotting, with said plotting means, said time as a function of said surface coordinates to generate a travel time curve for the particular reflecting zone, and
   e. repeating the foregoing steps for succeeding reflecting zones to generate a time section representing a travel time to the reflecting zones as functions of the surface coordinates along a line of exploration.

3. The method recited in claim 2 wherein said reflecting zones are displayed in the form of a seismic depth section on a display device in a computer graphics system, said method further comprising:
   generating, in said computing system, in response to the selection of a point on said seismic depth section by the use of an interactive device, the coordinates of said point on said seismic depth section, performing the aforementioned steps of generating the ray path and computing the travel time between said point and the corresponding surface coordinate point, and displaying on a display device said seismic time section with an indication of the travel time computed in the preceding step, said indication corresponding to the point on the seismic depth section selected by said interactive device.

4. The method recited in claim 2 wherein said subsurface formation includes a fault, said method further comprising:

generating the coordinates of sample points around said fault, repeating steps (b) and (c) of claim 3 for each sampling point around said fault, and plotting the travel times computed in the preceding step to generate a travel time curve for said fault.

5. The method recited in claim 2 performed on a computer graphics system in which said reflecting zones are displayed in the form of a seismic depth model on a display device and wherein a fault has been indicated on said seismic depth section by tracing said fault on said display device with an interactive device, said method further comprising:

generating the coordinates of sample points around said fault, and repeating steps (b) and (c) of claim 2 to generate the arrival time of seismic energy reflected from said fault and received at the surface of the earth.

6. The method recited in claim 2 wherein the step of generating the ray path includes:

generating a ray path from said sampling point normal to the interface and at an angle specified by the dip of the reflecting zone, and at successive layers generating a ray path specified by Snell's Law at each interface.

7. The method recited in claim 2 wherein the step of plotting is performed on an automatic plotter producing a hard copy output of said time section.

8. The method recited in claim 2 wherein the step of plotting is performed on a cathode ray tube type of display device producing a visible display of the time section on the face of said display device.

* * * * *